United States Patent [19]

Sessini

[11] Patent Number: 5,335,965
[45] Date of Patent: Aug. 9, 1994

[54] CUSHION FOR ANATOMICAL SUPPORT, ESPECIALLY FOR THE LUMBAR AND CERVICAL REGIONS, TO FIT ONTO SEAT BACKS

[76] Inventor: Lorenza Sessini, via Caimi, 32, Vailate, Italy

[21] Appl. No.: 917,060
[22] PCT Filed: Apr. 9, 1990
[86] PCT No.: PCT/IT90/00039
  § 371 Date: Jul. 30, 1992
  § 102(e) Date: Jul. 30, 1992
[87] PCT Pub. No.: WO91/13572
  PCT Pub. Date: Sep. 19, 1991

[30] Foreign Application Priority Data
Mar. 9, 1990 [IT] Italy ................. 19632 A/90

[51] Int. Cl.⁵ ................................. A47C 3/00
[52] U.S. Cl. ........................ 297/284.4; 297/284.7; 297/284.5; 297/DIG. 6; 403/45; 5/633
[58] Field of Search ............... 297/284.4, 284.7, 284.1, 297/284.2, 284.5, 284.8, 231, DIG. 6, 230.14; 403/43, 45; 5/632, 633, 643, 922

[56] References Cited

U.S. PATENT DOCUMENTS

| 2,673,632 | 3/1954 | Stiranka | 403/45 |
|---|---|---|---|
| 3,095,188 | 6/1963 | Glese . | |
| 4,627,661 | 12/1986 | Rönnhult et al. | 297/284.4 |
| 4,632,454 | 12/1986 | Naert | 297/460 |
| 4,718,724 | 1/1988 | Quinton . | |
| 5,022,709 | 6/1991 | Marchino | 297/284.1 |
| 5,197,780 | 3/1993 | Coughlin | 297/284.8 |
| 5,217,278 | 6/1993 | Harrison et al. | 297/284.7 |

FOREIGN PATENT DOCUMENTS

| 1105291 | 4/1961 | Fed. Rep. of Germany ... | 297/284.7 |
|---|---|---|---|
| 2040794 | 7/1971 | Fed. Rep. of Germany . | |
| 2541559 | 3/1977 | Fed. Rep. of Germany . | |
| 2554397 | 5/1985 | France . | |
| 2587201 | 3/1987 | France | 297/284.2 |
| 122458 | 1/1919 | United Kingdom | 403/43 |
| 360516 | 11/1931 | United Kingdom | 297/284.4 |
| 1077189 | 7/1967 | United Kingdom | 297/284.7 |
| 1115123 | 5/1968 | United Kingdom . | |

*Primary Examiner*—Peter M. Cuomo
*Assistant Examiner*—Darnell M. Boucher
*Attorney, Agent, or Firm*—Michael J. Striker

[57] ABSTRACT

Cushion (50) for anatomical support, especially of the lumbar and cervical regions, for mounting onto backs (42) of seats (41) generally, includes a curved elastic plate (51) having longitudinal ends connected by a posterior brace formed by a pair (55, 60) of rods threaded in opposite directions that screw into an intermediately placed cylindrical scroll (63) so that it is possible to vary the convexity of the plate (51) and therefore the extent to which the cushion projects from the seat back (42) by rotation of the scroll (63) in one direction or the other. It is also possible to adjust the height of the cushion, when placed inside the seat back (42), by a special internal mechanism (51, 71, 72, 74) operated by a knob (45) placed on the outside.

10 Claims, 5 Drawing Sheets

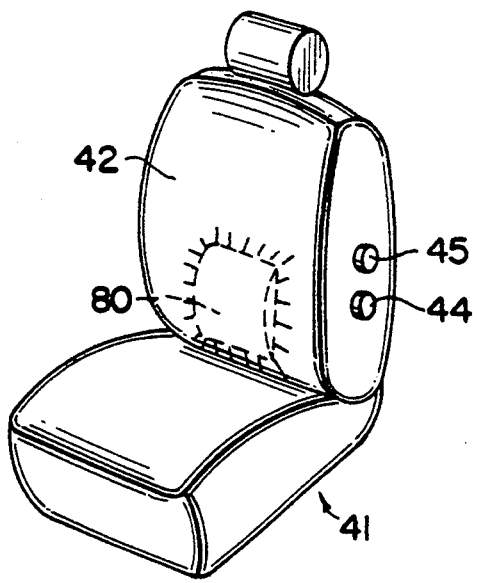
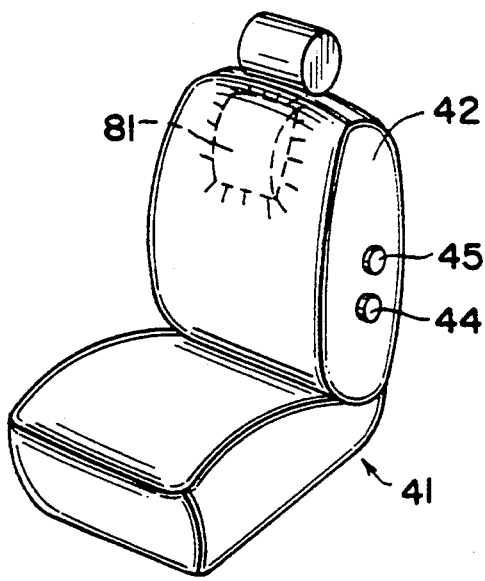
FIG.6
FIG.7
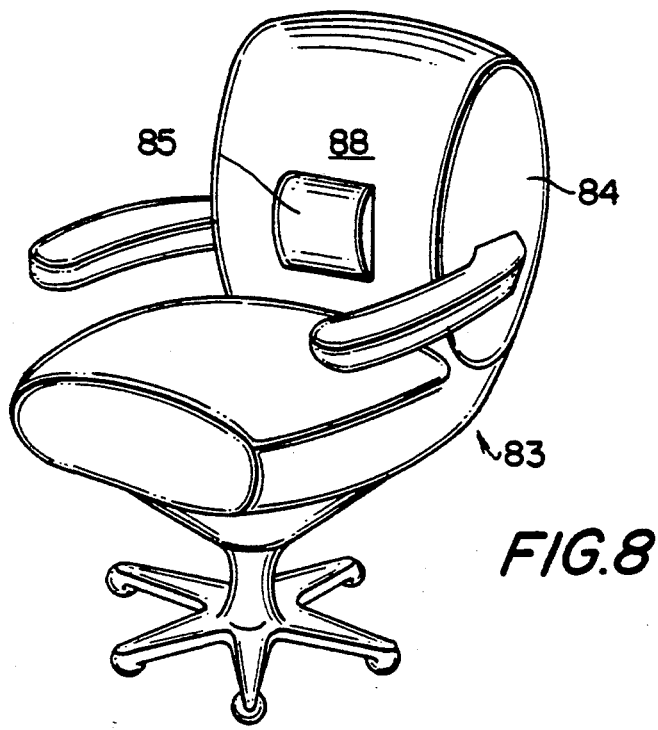
FIG.8
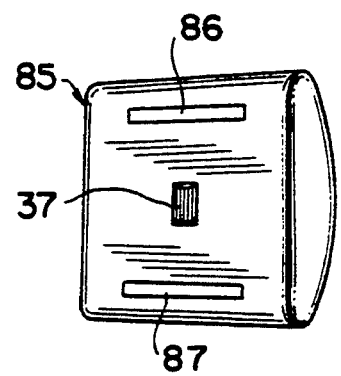
FIG.9

CUSHION FOR ANATOMICAL SUPPORT, ESPECIALLY FOR THE LUMBAR AND CERVICAL REGIONS, TO FIT ONTO SEAT BACKS

BACKGROUND OF THE INVENTION

The invention concerns a small cushion designed for anatomical support, especially to the lumbar and cervical regions, to be mounted onto the backs of seats.

Such small cushions are well known and are placed inside the seat backs of motor vehicles, their thickness and therefore projection being variable to suit the needs or preferences of the user.

These cushions are made by means of a device comprising a rigid structure combined with an elastic structure.

Convexity of the elastic structure in relation to the rigid structure may be obtained by a system of cams with a tie rod.

The cam is operated from outside the seat by means of a mechanism comprising a gear wheel and worm screw and a transmission shaft worked by an external knob.

The external structure consists of longitudinal metal bands crossing over transversal bands with outwardly projecting ends to ensure adequate spring.

This device is very complex and its outer surface is rough and sharp. It has therefore to be covered with a soft layer of considerable thickness.

The tie rod referred to above is involved in the curving movement of the elastic structure so that much effort is required to work the cam.

The worm strew is inserted to lessen effort when the device is adjusted but the knob has therefore to be given a great many turns making adjustment time far too long.

The device cannot be moved vertically from the lumbar to the cervical region or in between, or adapted to the stature, needs and preferences of the user.

These drawbacks lessen the advantages of the device not only due to its cost but also for practical reasons and duration.

SUMMARY OF THE INVENTION

The subject of the present invention is a small cushion, to support the lumbar-cervical regions of the back, of greatly simplified structure and operation, that can be used on the outside of the seat and moved up and down to suit the user.

According to the invention the cushion consists of a curved elastic plate whose longitudinal ends are connected posteriorly by a centrally placed vertical brace.

The brace is formed of a pair of aligned rods, threaded in opposite directions, that screw into an intermediate cylindrical scroll.

The convexity of the plate, and consequently thickness of the cushion and the extent to which it projects out from the surface of the seat back, can therefore be increased or lessened as desired by rotating the scroll one way or the other.

In a preferred embodiment the cushion is placed externally to the seat back while the outer surface of the scroll is knurled and can be turned by the fingers from the outside through a specially made aperture in the outer covering of the seat back.

At the two longitudinal ends of the plate there are pairs of slits for fixing the cushion to the outside of the seat back, at the height preferred by the user, by means of vertical bands wound around the seat back and passing through the slits.

In another embodiment the curved elastic plate is placed inside the seat back.

The scroll is connected to a first transversal shaft, projecting from the side of the seat back, by a bevel gear and a first universal joint.

A first knob is fixed to the first shaft for adjusting plate convexity from the outside.

In another embodiment the curved elastic plate slides on vertical runners fixed to the frame of the seat back and its height inside the seat back is determined by a continuous cord fixed centrally between the two longitudinal ends of the plate.

After passing over transmission rollers mounted at top and bottom of the seat back and rolling freely, the cord winds onto a drum of a second transversal shaft, supported by the seat back, projecting from the side of the seat back and terminating in a second knob for purposes of adjustment.

The scroll is connected to the first transversal shaft and knob by the first and second universal joint connected by an intermediate shaft.

It is an advantage to have the intermediate shaft made in two pieces both axially free but rotating together.

In one type of advantageous embodiment the scroll is connected by a pair of bevel gears, or some other mechanism, to a ratiomotor.

As regards its rotation in one direction or the other, the electric motor is worked by a switch which could be placed, for example, on the side of the chair.

Similarly, in another advantageous type of embodiment, the drum, on which the cord winds to vary as desired the height of the plate in relation to the seat back, is connected to a ratiomotor worked by a switch for rotation in one direction or the other.

In another type of embodiment at the back of the cushion there are strips of Velcro-type material to make it cling at the desired height to a seat back covering of a suitable kind.

By the present invention a cushion for anatomical support is obtained adjustable not only in thickness and therefore in its projection from the seat back, but also in height to give support, as desired, to the lumbar, cervical or other regions of the back as preferred by the user.

The subject cushion can be applied either to the outside or inside of practically all kinds of seat backs. It can be used in particular for office seats or armchairs, for seats in cinemas, conference rooms or stadiums, for seating in coaches, aeroplanes or motor vehicles, for means of transport generally for persons and goods.

Adjustments to the thickness of the cushion and/or to the height at which it is placed, whether mounted inside or outside the seat back, ensure great benefits for the user, since it supports the rib cage, facilitates digestion in persons wearing corsets, avoids or at least lessens the effects of cervical arthritis.

BRIEF DESCRIPTION OF THE DRAWING

Characteristics and purposes of the invention will become still clearer from the following examples of its embodiment illustrated by diagrammatic drawings in perspective.

FIGS. 6–7: The seat in FIG. 5 showing two positions for the internally mounted cushion.

FIG. 8: Office armchair with cushion for anatomical support to the lumbar-cervical regions mounted with Velcro-type strips outside the chair back.

FIG. 9: The cushion in FIG. 8 seen from the back.

DESCRIPTION OF THE PREFERRED EMBODIMENTS

Figure 1:
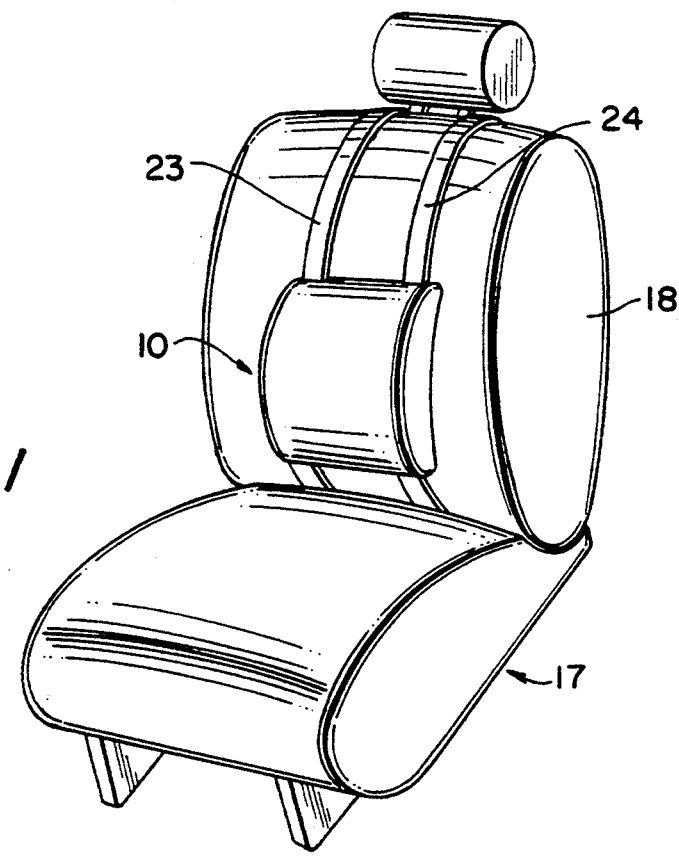
FIG. 1: Motor vehicle seat with cushion for anatomical support to the lumbar-cervical regions mounted externally and held in place by two bands.
Figure 3:
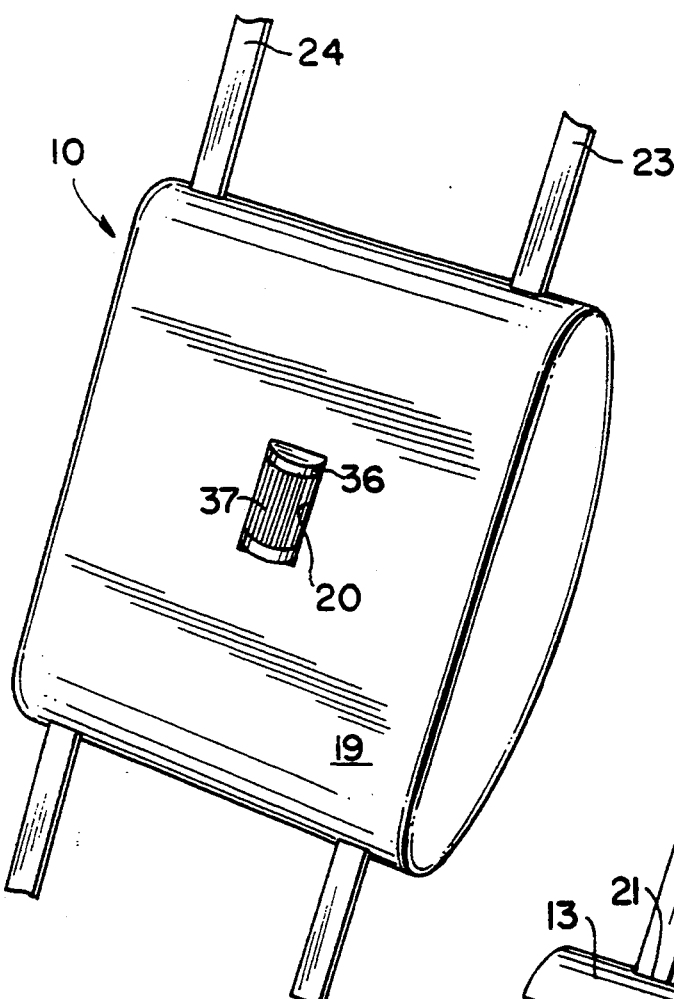
FIG. 3: The cushion illustrated in FIG. 1 from the back.

The cushion 10 (FIGS. 1, 3, 4) includes a device 11 comprising an elastic plate 12 with an upper end 13 and a lower end 14 curved back to form channels 15 and 16.

These ends contain the pairs of slits 21 and 22 through which the bands 23 and 24 pass respectively, for holding the cushion 10 to the back 18 of the motor vehicle 17.

The cushion 10 can of course be placed on the seat back at different heights by sliding it up or down the bands 23 and 24.

On the vertical axis of symmetry of the plate 12 there is a brace formed by a pair of aligned rods 30 and 33. The top end 31 and lower end 34 of the rods are fixed to the plate 12 inside channels 15 and 16, while rod ends 32 and 35, threaded in opposite directions, screw onto the cylindrical threaded scroll 36 with an externally knurled surface 37. In the covering 19 over the cushion 10 an aperture 20 (FIG. 3) is made to allow the fingers to work the scroll 36.

By rotating the scroll the user can move the ends 13 and 14 of the plate 12 nearer or farther away from each other and thus increase or reduce convexity thereby adjusting thickness of the cushion 10 to personal needs.

Figure 2:
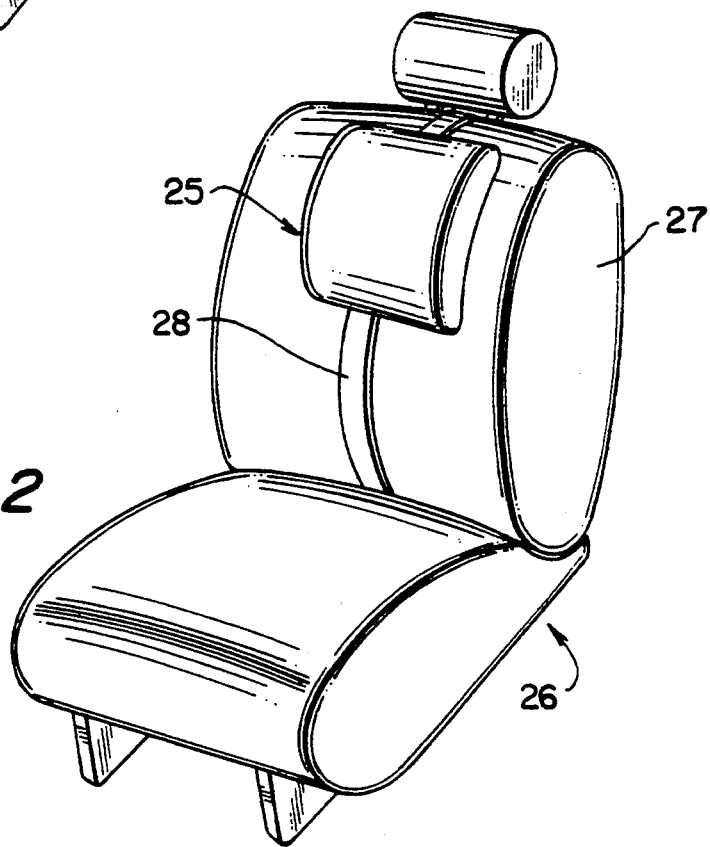
FIG. 2: The seat in FIG. 1 with cushion held in place by one band only.

FIG. 2 shows a cushion 25, substantially the same as the cushion 10 already described, fixed, to the back 27 of the seat 26 by a single band 28 made to pass through slits 29 (FIG. 4) cut in the plate 12.

Figure 4:
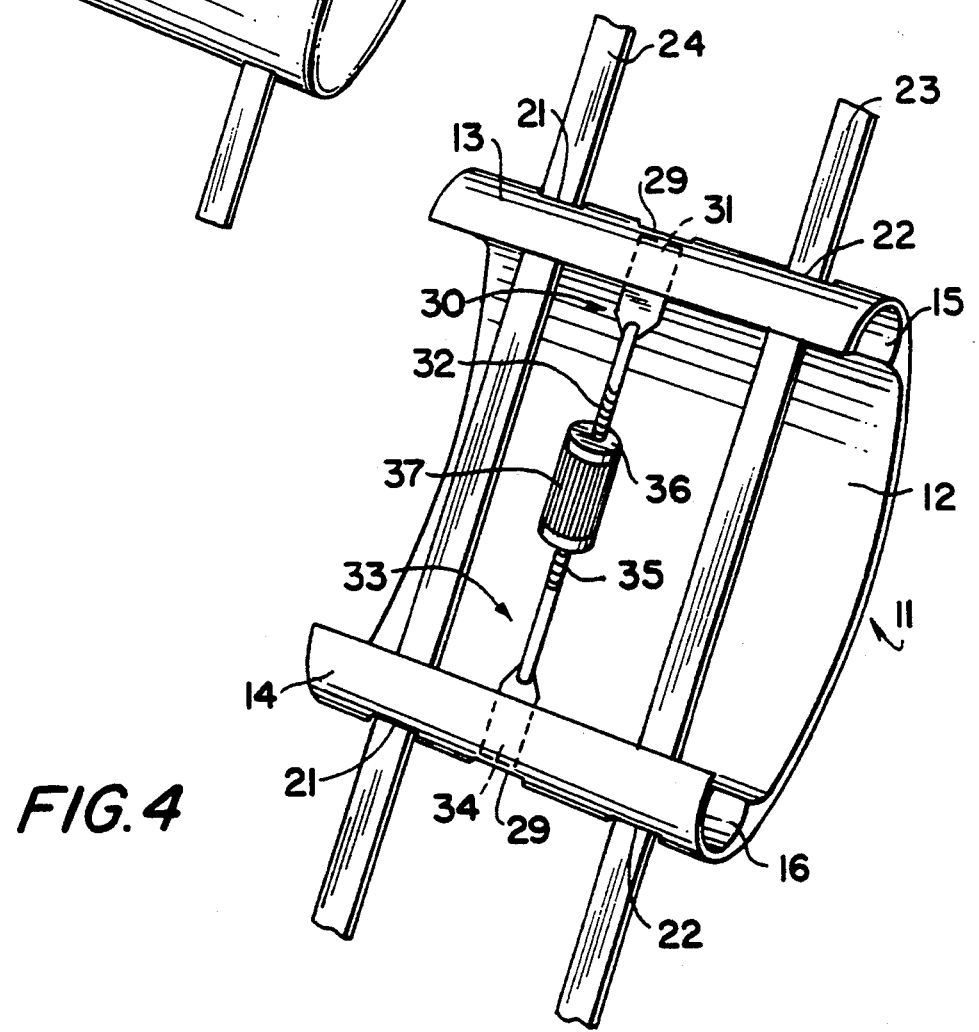
FIG. 4: Internal structure of the cushion in FIGS. 1–3.
Figure 5:
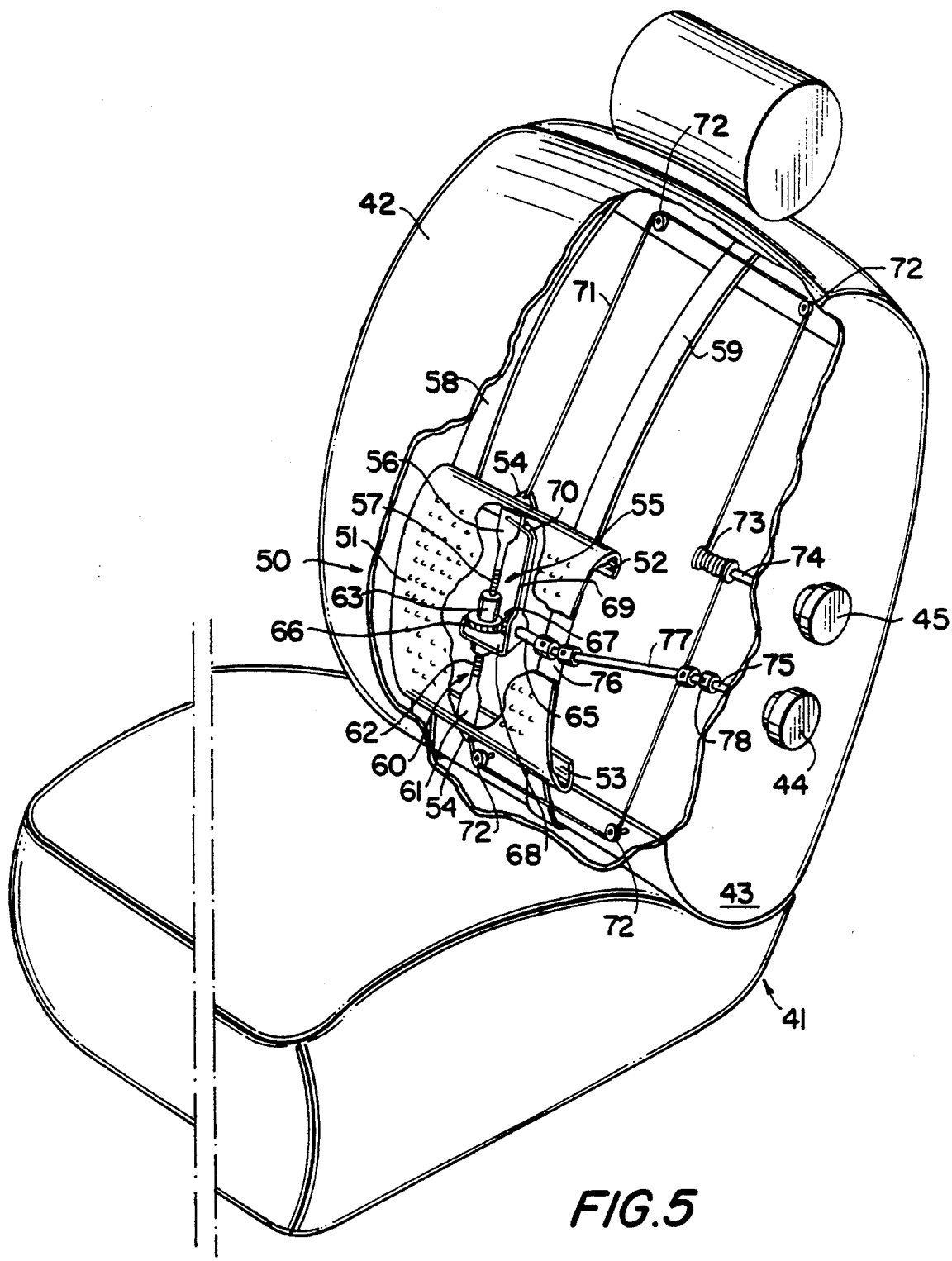
FIG. 5: Vehicle seat with cushion for anatomical support to the lumbar-cervical regions mounted inside the seat back cut away to show the device.

FIGS. 5, 6 and 7 refer to a cushion 50 for supporting the lumbar-cervical region, similar to cushions 10 and 25 already described but placed inside the back 42 of the seat 41 for motor vehicles and visible in the cut-away in FIG. 5, comprising an elastic plate 51, substantially the same as the plate 12 already described and seen in FIG. 4, and a pair of bracing rods, and upper one 55 and lower one 60.

The rods comprise their flat ends 56 and 61 fixed respectively to the upper 52 and lower 53 channel-shaped ends of the plate 51, and the opposingly threaded ends 57 and 62 screwed into the cylindrical scroll 63.

The scroll is mechanically connected to the short shaft 65 by means of the bevel gear 66–67. The bevel gear is held in place by the L-bar 68 whose rotation in relation to the gear wheel 66 is prevented by the rigid arm 69 with upper fork 70 into which is inserted the flat end 56 of the upper tie rod 55 mentioned above.

A bevel gear shaft 65 is mechanically connected to a first transversal shaft 75 which turns on supports fixed to the back 42 of the seat 41 (not seen in FIG. 5) by first universal joint 78 and second universal joint 76 at the opposite ends of the intermediate shaft 77.

The bevel gear shaft 65 referred to above can be worked externally from the side 43 of the back 42 by a first knob 44. Rotating the knob thus rotates the scroll 63 and therefore increases or reduces, as preferred, the convexity of the elastic plate 51 to obtain the same effect as given by manual rotation of the scroll 36 on plate 12 of device 11 illustrated previously in FIG. 4.

The plate 51 can slide on vertical guides 58, 59 made inside the seat back 42, the guides passing through slits cut into the plate.

Sliding movement is brought about by the continuous cord 71 fixed, at its two ends, to loops 54 placed top and bottom of the curved elastic plate 51.

The cord 71 passes over revolving transmission rollers 72 supported by the structure of the seat back 42 and winds round the drum 73 of a second shaft 74 that extends from a second knob 45 projecting from the side 43 of the seat back.

Therefore, by turning the second knob 45, plate 51 can be moved up and down to the position preferred by the user.

The movement is made possible by first and second universal Joints 76 and 78 that give shaft 77 the angle necessary for moving the plate 51.

In FIGS. 6 and 7, numbers 80 and 81 mark the positions that the internally mounted cushion can reach by turning the second knob 45.

FIGS. 8 and 9 illustrate application of a cushion 85, similar to cushion 10 illustrated in FIGS. 1–4, to the back 84 of an office armchair 83 by Velcro-type strips 86,87 that cling to the covering 88 of suitable composition.

This means of application can obviously also be used on the seat backs of motor vehicles.

Figure 10:
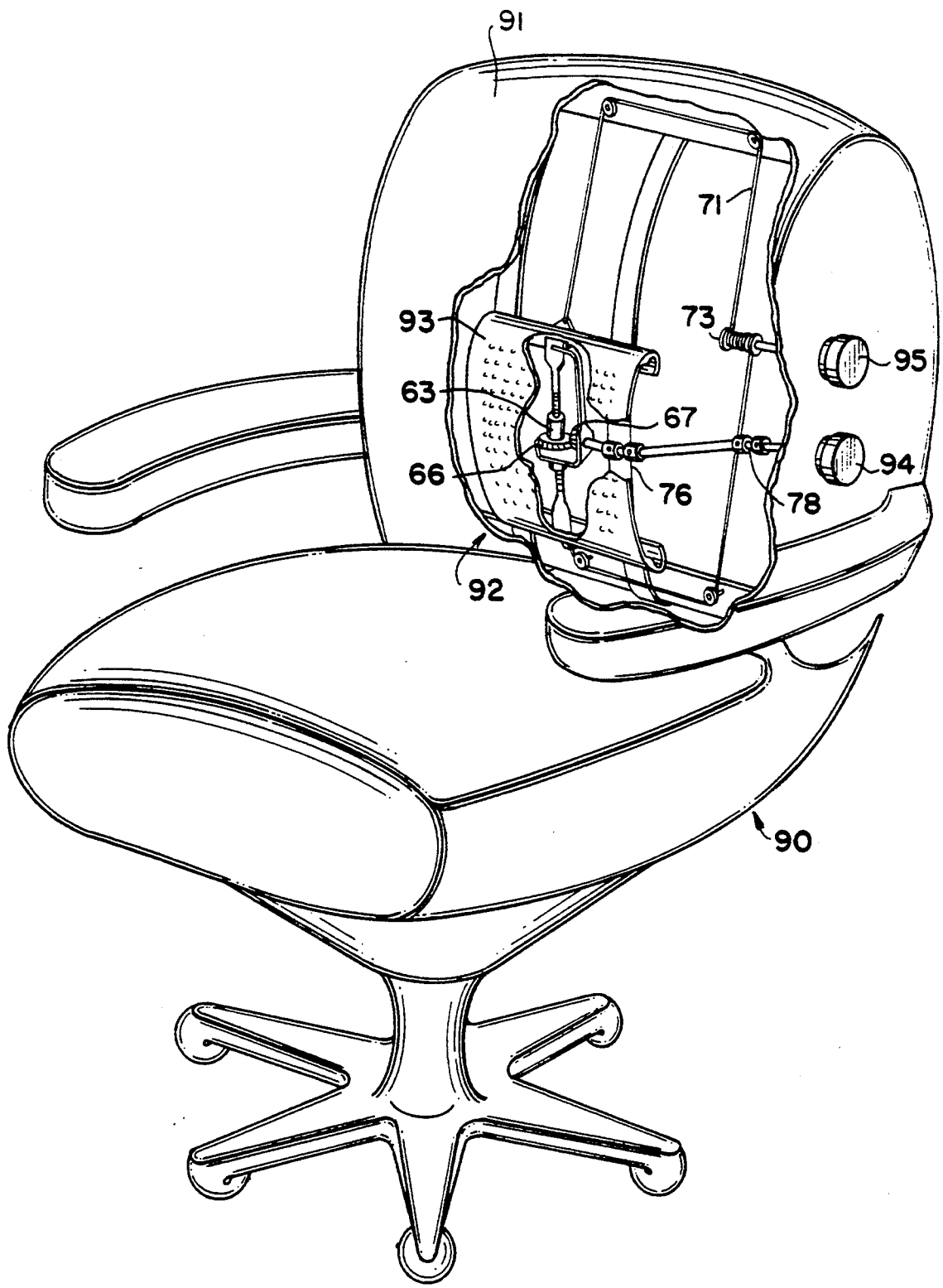
FIG. 10: Office armchair with cushion for anatomical support to the lumbar-cervical regions mounted inside the back.

FIG. 10 illustrates the application, inside the back 91 of an office chair 90, of a cushion 92 similar to cushion 50 already illustrated in FIG. 5.

The plate 93 can be seen as well as the various mechanisms operated by second and first knobs 94 and 95 for respectively varying the convexity of the plate and for moving it vertical on the seat back.

The word "vertical" in the term "vertical central brace" means a longitudinal direction from the bottom of the seat back to the top of the seat back.

The curved elastic plate is located inside the seat back so that the "upper" channel is closer to the top end of the seat back than the bottom end and the "lower" channel is closer to the bottom end of the seat back and the vertical central brace extends between them.

I claim:

1. Adjustable cushion for anatomical support mountable on a back of a seat, said adjustable cushion comprising:

a curved elastic plate having longitudinal ends, said longitudinal ends of said plate being curved backwards so as to form an upper channel and a lower channel and said elastic plate being mountable on said back of said seat projecting convexedly from said back; and means for adjusting a convexity of said curved elastic plate including a posterior vertical central brace consisting of a pair of aligned threaded rods having posterior ends and threaded in opposite directions and a cylindrical scroll means receiving said aligned threaded rods so that said posterior ends of said threaded rods are securable in said upper and lower channels and said convexity of said curved elastic back can be varied by rotating said scroll means.

2. Adjustable cushion as defined in claim 1, wherein said scroll means has an external surface and said external surface is accessible from a rear side of said curved elastic plate and is knurled so as to be manually operable.

3. Adjustable cushion as defined in claim 1, wherein said longitudinal ends of said plate are provided with at least one pair of slits, and further comprising means for adjusting a vertical height of said curved elastic plate on said back, said means for adjusting including at least one vertical band wound around said back and said at least one pair of slits in said curved elastic plate, said slits being formed to receive said at least one vertical band so as to allow said curved elastic plate to be located at any vertical position on said back.

4. Adjustable cushion as defined in claim 1, wherein said longitudinal ends of said plate are provided with slits, and further comprising means for adjusting a vertical height of said curved elastic plate inside said back, said means for adjusting comprising a plurality of vertical guides in said back and said slits provided in said longitudinal ends through which said vertical guides pass and means for adjustably positioning said curved elastic plate at any vertical position in said back by moving said curved elastic plate on said guides, said means for adjustably positioning being accessible from outside of said seat.

5. Adjustable cushion as defined in claim 4, wherein said curved elastic plate is inside said back of said seat, and said means for adjustably positioning said curved elastic plate includes a second knob outside said back, a second transversal shaft projecting from a side of said back and fixed to said second knob, a drum in said back and attached to an end of said second transversal shaft remote from said second knob, a plurality of freely rotating transmission rollers in said back and supported rotatably in the vicinity of said longitudinal ends, and a cord wound around said drum, passing over said transmission rollers and being attached to said curved elastic plate at each of said longitudinal ends so that, when said second knob is rotated, said curved elastic plate is moved on said vertical guides.

6. Adjustable cushion as defined in claim 1, further comprising means for adjustably positioning said curved elastic plate on said back of said seat, said means for adjustably positioning including Velcro-type strips structured to cling to a covering of said back, said Velcro-type strips being located at a plurality of positions on a rear side of said curved elastic plate.

7. Adjustable cushion as defined in claim 1, wherein said curved elastic plate is shaped for anatomical support of lumbar and cervical regions.

8. Adjustable cushion for anatomical support mounted on a back of a seat, said adjustable cushion comprising
a curved elastic plate located inside said back of said seat and having longitudinal ends, said longitudinal ends of said plate being curved backwards so as to form an upper channel and a lower channel and said elastic plate being mountable on said back of said seat projecting convexedly from said back; and
means for adjusting a convexity of said curved elastic plate including a posterior vertical central brace consisting of a pair of aligned threaded rods having posterior ends and threaded in opposite directions and a cylindrical scroll means receiving said aligned threaded rods so that said posterior ends of said threaded rods are securable in said upper and lower channels and said convexity of said curved elastic back can be varied by rotating said scroll means,
wherein said means for adjusting a convexity of said curved elastic seat back includes a bevel gear connected to said scroll means for rotation of said scroll means, a first knob outside said back, a first transversal shaft projecting from a side of said back on which said first knob is mounted, and a first universal joint connected to said first transversal shaft and said bevel gear, so that when said first knob is rotated said scroll means is rotated to adjust said convexity of said curved elastic plate.

9. Adjustable cushion for anatomical support mountable on a back of a seat, said adjustable cushion comprising
a curved elastic plate located inside said back of said seat and having longitudinal ends provided with slits, said longitudinal ends of said plate being curved backwards so as to form an upper channel and a lower channel and said elastic plate being mountable on said back of said seat projecting convexedly from said back; and
means for adjusting a convexity of said curved elastic plate including a posterior vertical central brace consisting of a pair of aligned threaded rods having posterior ends and threaded in opposite directions and a cylindrical scroll means receiving said aligned threaded rods so that said posterior ends of said threaded rods are securable in said upper and lower channels and said convexity of said curved elastic back can be varied by rotating said scroll means,
means for adjusting a vertical height of said curved elastic plate inside said back, said means for adjusting comprising a plurality of vertical guides in said back and said slits provided in said longitudinal ends through which said vertical guides pass and means for adjustably positioning said curved elastic plate at any vertical position in said back by moving said curved elastic plate on said guides, said means for adjustably positioning being accessible from outside of said seat,
wherein said means for adjusting a convexity of said curved elastic seat back includes a bevel gear connected to said scroll means for rotation of said scroll means, a first knob outside said back, a first transversal shaft projecting from a side of said back to which said first knob shaft is fixed, a first universal joint connected to said first transversal shaft, a second universal joint connected to said bevel gear, and an intermediate shaft connected between said first and second universal joints, so that, when said first knob is rotated, said scroll means is rotated to adjust said convexity of said curved elastic plate; and said means for adjustably positioning said curved elastic plate includes a second knob outside said back, a second transversal shaft projecting from a side of said seat back and fixed to said second knob, a drum in said back and attached to an end of said second transversal shaft remote from said second knob, a plurality of freely rotating transmission rollers in said back and supported rotatably in the vicinity of said longitudinal ends, and a cord wound around said drum, passing over said transmission rollers and being attached to said curved elastic plate at each of said longitudinal ends so that when said second knob is rotated said curved elastic plate is moved on said vertical guides.

10. Adjustable cushion as defined in claim 9, wherein said intermediate shaft consists of two pieces connected nonrotatably to each other but slidable axially in relation to each other so that said intermediate shaft can change length as said curved elastic plate is moved by said means for adjustably positioning.

* * * * *